Patented May 4, 1948

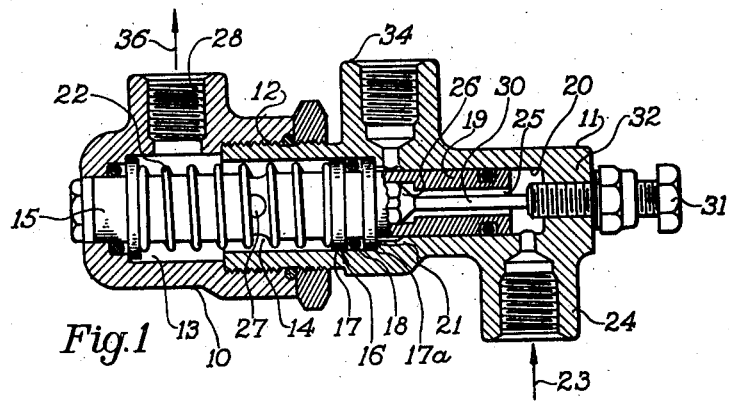
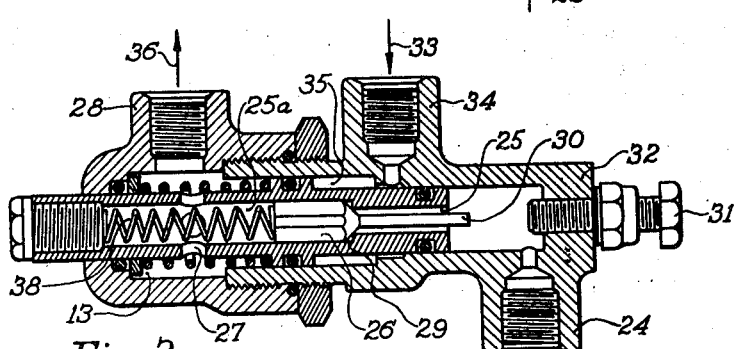
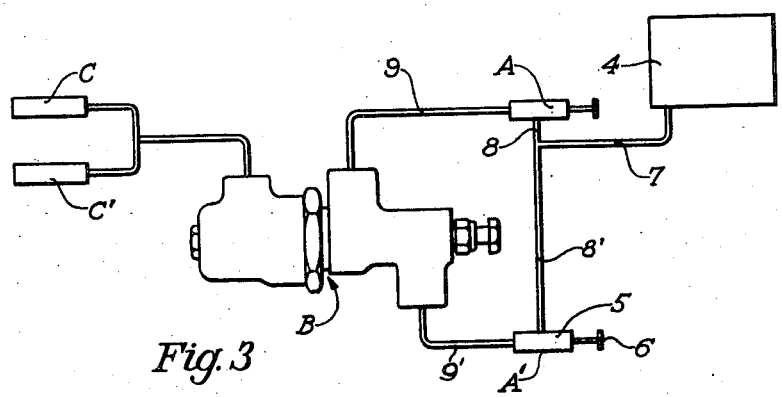

2,441,040

UNITED STATES PATENT OFFICE 2,441,040

HYDRAULIC SYSTEM

Robert B. Sprague, Long Beach, and Louis E. Berthelson, Los Angeles, Calif., assignors to North American Aviation, Inc.

Application August 2, 1944, Serial No. 547,803

9 Claims. (Cl. 60—54.5)

This invention relates to hydraulic systems and has as its general object to provide control mechanism which permits hydraulic pressure to be transmitted from either of two pressure creating sources to a common pressure actuated device. It has special application to hydraulic brake systems for vehicles such as aircraft wherein it is desirable to permit control of the brakes from either of two pilot's stations.

A further object of the invention is to provide control mechanism which permits two independent pressure creating devices to be operated either singly or simultaneously and, under conditions of simultaneous operation, to transmit the force of only one of the devices, i. e., which prevents the simultaneously applied forces being added to each other in the effect upon the actuated device.

Another object of the invention is to provide in a hydraulic system of the type indicated, a control mechanism which, in response to pressures delivered from both of two independently controlled pressure creating devices, will transmit to the actuated device the highest of such pressures and will prevent the transmission of the lower pressure.

More specific objects of the invention are to provide a control mechanism which is responsive to the higher of two sources of pressure and which will transmit such higher pressure to a common actuated device; to provide such a control mechanism which is of relatively simple, inexpensive and durable construction; to provide a control mechanism having two inlets and a single outlet and which is adapted to transmit pressure from one inlet to the outlet directly through a fluid column and to transmit fluid from the other inlet to the outlet by displacement of a moving part of the control mechanism which separates the columns of fluid at the inlet and outlet of the control mechanism.

While the invention may be applied to various types of hydraulic systems, we have chosen an airplane hydraulic brake system for the purpose of illustrating one embodiment of the invention in the accompanying drawings, wherein:

Fig. 1 is a longitudinal sectional view through a control mechanism incorporating the invention, in the position in which it transmits pressure from one of two alternative sources;

Fig. 2 is a longitudinal sectional view through the control mechanism shown in the position in which it transmits pressure from another source; and Fig. 3 is a schematic showing of a hydraulic system incorporating the invention.

Referring first to Fig. 3, a hydraulic brake system incorporating the invention may include a pair of alternate sources of pressure A and A' fed from a reservoir 4 and adapted to transmit pressure, through the control mechanism B, to a set of actuated devices C and C' (such as hydraulic brakes) which are indicated schematically. The pressure sources A and A' may be of any conventional type, either power-driven or manually-operated, the devices chosen for illustration being the manually-operated type including a cylinder 5 and a piston therein operated by a foot pedal 6, receiving fluid from the reservoir 4 through the supply lines 7, 8 and 8', and adapted, when the plungers are depressed, to force the fluid into the control mechanism B through the lines 9 and 9'.

Referring now to Fig. 1, the control mechanism B comprises a housing in two sections, 10 and 11 (to permit access to the internal parts) threaded together as at 12. Within the section 10 is defined a chamber 13 and in the section 11 is a cylinder 14 which cooperates with the chamber 13 to accommodate a plunger 15. The plunger 15 has a piston indicated generally at 16 and operating in the cylinder 14. The piston 16 comprises a pair of flanges 17, 17a on the plunger 15, and an O ring 18 of compressible, resilient material such as neoprene, which is confined between the flanges 17, 17a and engaged under compression against the wall of the cylinder 16.

The plunger 15 has a reduced shank portion 19 which is received in a cylinder 20 of reduced diameter in the casing section 11. The cylinders 19 and 20 are separated by a shoulder 21 against which the flange 17a is urged (by a coil spring 22) in order to define one limit of movement of the plunger 15. In this position of the plunger 15, fluid from the source A' will enter the control mechanism (as indicated between arrow 23) through the inlet 24, thence will pass through a bore 25 in the plunger 15 and past a valve element 26 into an enlarged bore 25a (see Fig. 2), thence through a port 27 in the side of the plunger 15 and into the chamber 13, and thence out through the outlet 28 as indicated by the arrow 36. The valve element 26 is adapted, in the alternate position of the valve shown in Fig. 2, to seat against a valve seat 29 in the form of a shoulder defined between the bores 25 and 25a, but in the position shown in Fig. 1, the valve 26 is unseated by the engagement of its stem 30 with the end of a set screw 31 threaded through the end wall 32 of the casing section 11. A light spring 38 urges the valve element toward seating position.

In the position of the control mechanism shown in Fig. 2, pressure is transmitted as indicated by the arrow 33 through the inlet 34 into a chamber 35 which is defined between the flange 17a and the shoulder 21 within the cylinder 14. Expanding the chamber 35, the fluid forces the plunger 15 to the left as viewed in the drawing, compressing the spring 22, and placing the fluid in the chamber 13 under pressure. As soon as sufficient movement of the plunger 15 has occurred to move the stem 30 out of contact with the set screw 31, the valve element 26 will seat under the combined action of the spring 38 and the pressure of fluid in the chamber 13 so as to prevent flow of fluid through the bores 25a, 25 and thus the continued movement of the plunger to the left will force fluid out of the outlet 28 as indicated by the arrow 36.

When pressure is applied to both inlets 24 and 34 simultaneously, the pressure at the inlet 34, if greater than that at the inlet 24, will overcome the pressure from the inlet 24 tending to open the valve 26, causing the valve 26 to close so as to cut off flow from the inlet 24 and only the pressure from the inlet 34 will be transferred to the outlet 28. Conversely, if the pressure at the inlet 24 is sufficiently greater it will overcome the combined pressure from the inlet 34 and the push of the light spring 38 tending to close the valve 26, resulting in the valve 26 being opened and the pressure being transmitted by fluid column through the bores 25, 25a and the chamber 13. Since the pressure in the chamber 13 will be transmitted in all directions, it will react against the piston 16 in greater force than the pressure acting against the piston 16 from the inlet 34 and will therefore neutralize the latter pressure. In either case, the pressure from either inlet is balanced against the pressure from the other inlet while being applied to the outlet, and consequently only the higher pressure will be applied at the outlet.

When pressure on the foot pedals is released the back pressure in the brake lines will force the plunger 19 toward the right as viewed in the drawings, forcing the fluid from the chamber 35 back out through the inlet 34 and forcing the fluid from the chamber 20 back through the inlet 24. As the plunger nears the end of its retracting stroke, the stem 30 of the valve element will be stopped by the set screw 31 and further retracting movement of the plunger will cause the valve 26 to open and permit the pressure to equalize between the ports 24 and 28 through the bores 25 and 25a.

The foregoing may be taken as illustrative of one form in which the invention may be embodied, it being our intention to cover in our claims the use of any equivalent arrangement or apparatus.

We claim as our invention:

1. For a hydraulic system including a plurality of sources of fluid pressure and a common fluid path for the transmission of pressure to an actuated device or devices, a control mechanism operatively connected to said plurality of sources to receive pressure therefrom and to selectively transmit the greater of such pressures to said common path, said control mechanism including a continuous fluid passageway extending from one of said sources to said common path and a moving part through which pressure is transmitted from the other of said sources to the fluid in the common path.

2. In combination with a hydraulic system including a plurality of sources of fluid pressure and a common fluid path for the transmission of fluid pressure to an actuated device or devices, a control mechanism adapted to receive the fluid pressure from both of said sources and to deliver such pressure to said common path, said control mechanism including a continuous fluid passageway extending from one of said sources to said common path, a moving part through which pressure is transmitted from the other of said sources to the fluid in the common path and means responsive to pressure from the greater of said sources to equalize the pressure from any lesser source to thereby transmit pressure from the greater source to the common path.

3. A control mechanism as defined in claim 1, wherein said continuous fluid passageway comprises the bore of a hollow plunger which includes a piston comprising said moving part, said bore communicating with one of said fluid pressure sources and said piston being subject to fluid pressure from the other source.

4. A control mechanism as defined in claim 1, wherein said continuous fluid passageway comprises the bore of a hollow plunger which includes a piston comprising said moving part, said bore communicating with one of said fluid pressure sources and said piston being subject to pressure from the other of said fluid pressure sources, and a valve in said bore adapted, when the fluid pressure against said piston is greater than that against the face of the valve in said bore, to close said bore against the transmission of fluid therethrough, and, when the pressure against the valve in said bore is greater than that against said piston, to open said bore to the transmission of fluid pressure through the continuous column of fluid.

5. A control mechanism comprising a casing having two inlets and a single outlet and defining a cylinder therein, a plunger movable in said cylinder and having a piston dividing the same into an inlet chamber in communication with one of said inlets and an outlet chamber in communication with said outlet, said plunger having a bore and a valve for closing said bore, said bore being adapted, when said valve is open, to establish a fluid column from the other of said inlets to said outlet, said valve being adapted to close under pressure transmitted to said outlet chamber by said piston from said inlet chamber, when said last mentioned pressure is greater than that applied to said other inlet to said bore.

6. A control mechanism as defined in claim 5, wherein said casing provides a second inlet chamber of less diameter than said cylinder and separated therefrom by a shoulder against which said piston is adapted to abut to limit retracting movement of said plunger, and resilient means for yieldingly urging said plunger in the retracting direction, said shoulder defining one extremity of said first mentioned inlet chamber.

7. A control mechanism as defined in claim 5, wherein said casing provides a second inlet chamber of less diameter than said cylinder and separated therefrom by a shoulder against which said piston is adapted to abut to limit retracting movement of said plunger, and resilient means for yieldingly urging said plunger in the retracting direction, said shoulder defining one extremity of said first mentioned inlet chamber, said valve element having a stem adapted, in said retracted position of the plunger, to contact a fixed abutment carried by said casing, thereby to open said valve.

8. In combination with a hydraulic system including a plurality of sources of fluid under pressure and a common path for the transmission of fluid under pressure to an actuated device or devices, a control mechanism adapted to receive the fluid pressure from either or both of said sources, said control mechanism including means to transmit the fluid pressure to the actuated device or devices from the one of said sources which provides the higher pressure, means for maintaining separation between the fluid from said sources, and means responsive to release of the fluid pressure at said sources to release fluid from said common path.

9. For a hydraulic system including a plurality of sources of fluid pressure and a common fluid path for the transmission of pressure to an actuated device or devices, a control mechanism for selectively transmitting pressure from either of said plurality of sources to said common path including a part movable in response to pressure from one of said sources to thereby transmit pressure to said common path, a passageway connecting another of said sources to said common path and means responsive to the pressure from the greater of said sources to equalize the pressure from any lesser source whereupon only pressure from the greater source will be transmitted to the common path.

ROBERT B. SPRAGUE.
LOUIS E. BERTHELSON.

REFERENCES CITED

The following references are of record in the file of this patent:

UNITED STATES PATENTS

| Number | Name | Date |
|---|---|---|
| 2,216,855 | Sanford | Oct. 8, 1940 |
| 2,247,302 | Lévy | June 24, 1941 |
| 2,300,694 | Overbeke | Nov. 3, 1942 |
| 2,312,686 | Campbell | Mar. 2, 1943 |
| 2,342,878 | Majneri | Feb. 29, 1944 |